United States Patent

[11] 3,619,029

| [72] | Inventor | James D. Crownover |
| | | Dallas, Tex. |
| [21] | Appl. No. | 511,022 |
| [22] | Filed | Nov. 26, 1965 |
| [45] | Patented | Nov. 9, 1971 |
| [73] | Assignee | Texas Instruments Incorporated |
| | | 13500 North Central Expressway, Dallas 31, Tex. |

[54] INFRARED-RECONNAISSANCE SYSTEM
3 Claims, 7 Drawing Figs.

[52] U.S. Cl. .................................................... 350/7,
350/6
[51] Int. Cl. ........................................................ G02b 17/00
[50] Field of Search ............................................ 178/6.8,
7.6; 350/6, 7

[56] References Cited
UNITED STATES PATENTS

| 2,997,539 | 8/1961 | Blackstone | 178/7.6 |
| 3,019,292 | 1/1962 | John | 178/6.8 X |
| 3,087,986 | 4/1963 | DeBrasse | 178/6.8 X |
| 3,200,196 | 8/1965 | Jenkins | 178/6.8 |
| 3,299,205 | 1/1967 | Stavis | 178/6.8 |

*Primary Examiner*—Richard A. Farley
*Assistant Examiner*—Joseph G. Baxter
*Attorneys*—Samuel M. Mims, jr., James O. Dixon, Andrew M. Hassell, Harold Levine, John E. Vandigriff and Rene' E. Grossman

ABSTRACT: An infrared-reconnaissance system is disclosed which comprises an infrared detector, optical means for both viewing the forward area defined by a predetermined elevation angle and for simultaneously scanning an area substantially perpendicular to the line of flight of the aircraft and transmitting same to the detector. Display means responsive to the video output of the detector produces a visual image of the radiation sensed along a first display dimension corresponding to the elevation angle scan and along a second display dimension corresponding to the scan which is substantially perpendicular to the line of flight of the aircraft.

DIRECTION OF FLIGHT →

INVENTOR
James D. Crownover

BY V. Lawrence Sewell

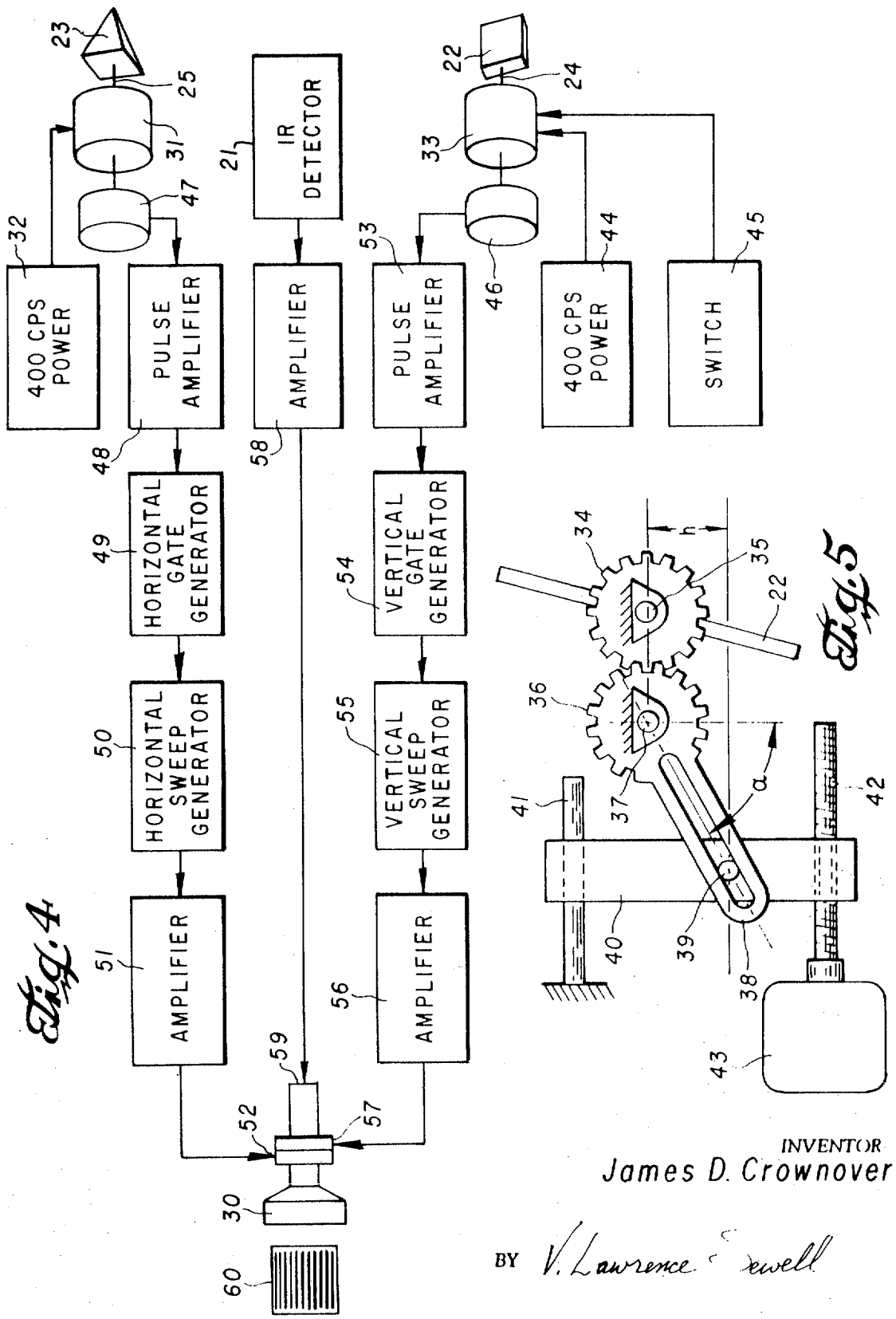

INFRARED-RECONNAISSANCE SYSTEM

An infrared-reconnaissance system is particularly useful for reconnaissance at night because it can detect the infrared image of an area in the absence of visible light and electronically convert the infrared image to a visible one. It has been conceived in accordance with the invention that a sufficiently accurate infrared reconnaissance of the area forward of a military aircraft, presented in a visible, real-time display, would allow a selective discharge of weapons into the observed area to tactical advantage.

In accordance with one embodiment of the invention, there is provided an infrared radiation detector responsive to the infrared radiation from a small sector of the area forward of an aircraft. An optical system scans the small sector over the area to be observed, while the detector generates electrical signals representative of the infrared radiation being detected. The signals are applied to a cathode-ray tube to produce on the face thereof a spot of light varying in intensity with the electrical signals and hence with the intensity of the infrared radiation being detected. Sweep circuitry positions the spot of light at a location on the tube face corresponding to the terrain location from which the radiation is being detected. The result is a visual presentation of the infrared image of the forward area, having much the same appearance as the display which would be produced by a television camera observing the forward area in daylight. Such a scene, displayed in time as it would appear to a camera or viewer, is known as a "real-time display."

The terrain area forward of the aircraft is scanned, according to the invention, in the dimension parallel to the line of flight of the aircraft and simultaneously in the dimension transverse to the line of flight. The optical system of the invention enables the detector to scan at a substantially faster speed in the transverse or azimuthal scan dimension than in the parallel or elevation scan dimension. Moreover, the scan in the azimuthal dimension may be made up of successive scans, each beginning at one side of the forward area, moving completely across the area to the other side, and followed by a second scan beginning also at said one side. The use of such an optical system and the resulting scan mode can produce a visual presentation of sufficient accuracy to enable an operator to direct a weapon against forward targets observed by means of the system of the invention. The accurate real time display provided by the infrared system of the invention may be used to advantage in applications other than airborne reconnaissance. The system may be employed as a reconnaissance tool in ground to air operation, or for navigation aboard a motor vehicle or a ship. Moreover, infrared images of the body produced by such a system may be used in medical diagnosis. The system can also provide a view of industrial processes requiring darkness, such as the manufacture of film.

Therefore, it is an object of the invention to provide a forward looking infrared reconnaissance system.

It is another object of the invention to provide an accurate forward-looking infrared-reconnaissance system presented in a real-time display.

These and other objects, features and advantages of the invention will be more readily understood from the following detailed description when read in conjunction with the appended claims and attached drawings, in which:

FIG. 4 is a diagram of the electrical portion of a preferred embodiment of the reconnaissance system of the invention.

FIG. 5 shows a scan mechanism for use with the system of FIG. 4.

Figure 1:
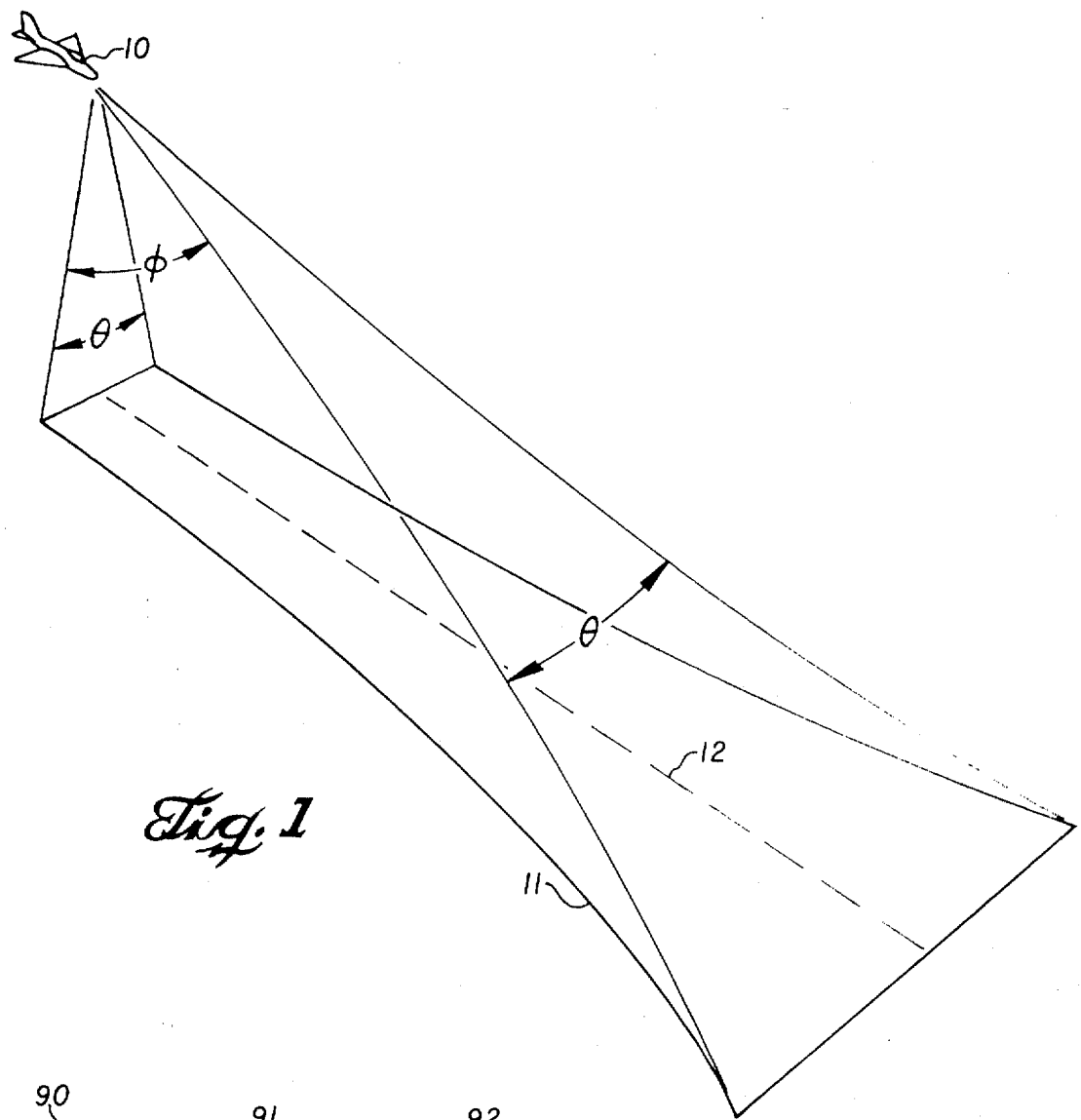
FIG. 1 illustrates the scanning provided by the system of the invention.

Referring now to the various figures, FIG. 1 shows an aircraft 10 detecting the infrared radiation from a terrain area 11 forward of the aircraft. The extent of the scanning is defined by elevation angle and azimuthal angle $\theta$. The azimuthal scan may be symmetrical about the line of flight 12. Both embodiments of the invention set forth below perform the infrared detection over the angle $\theta$ by scanning the ground in an azimuthal direction, that is, substantially perpendicular to the line of flight of the aircraft. One of said embodiments also performs, simultaneously, an elevation scan, that is, substantially parallel with the line of flight, through the angle . In the other embodiment, the infrared detector is responsive to radiation from a small sector of angle , and the elevation scan of the area 11 is performed simply by the forward motion of the aircraft 10.

Figure 3:
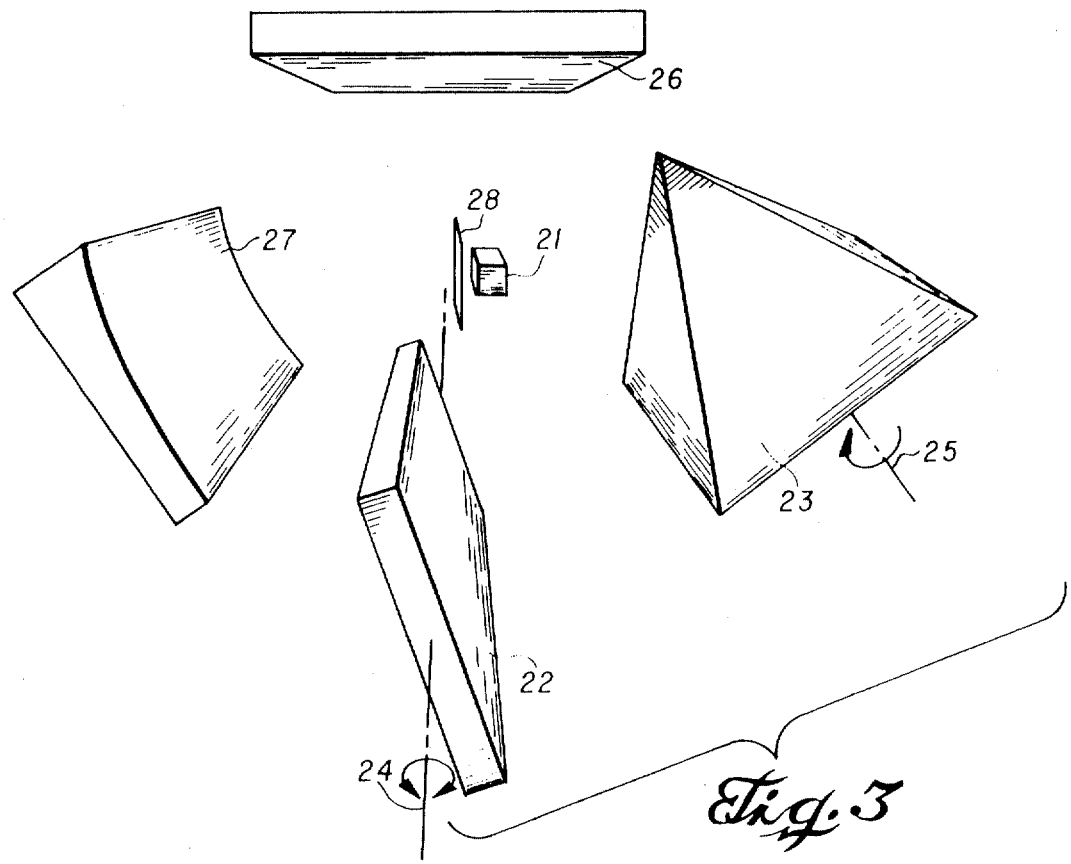
FIG. 3 is a perspective view of the optics in FIG. 2.
Figure 2:
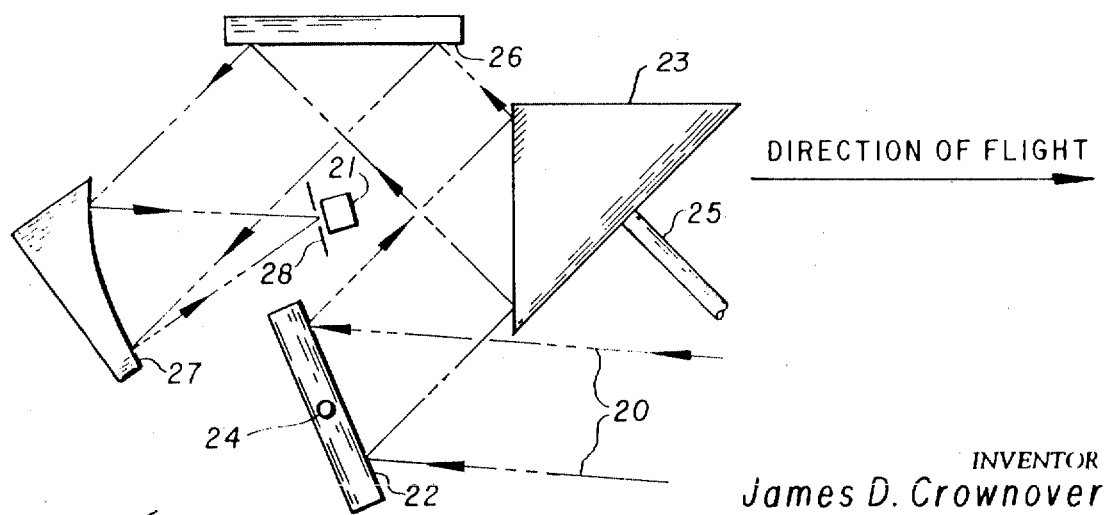
FIG. 2 is an elevation view of the optical portion of the reconnaissance system of the invention.

The scanning optics of the invention are shown in FIGS. 2 and 3. Infrared radiation from the terrain area 11, indicated by rays 20, is directed by the optical system to infrared radiation detector 21. The incident rays 20 are reflected by forward scan mirror 22 to azimuth scan mirror 23. Forward scan mirror 22 is simply a plane mirror rotatable about axis 24. In one embodiment, mirror 22 oscillates about axis 24, thereby producing a scan of the forward terrain in the elevation direction. In another embodiment of the invention, mirror 22 remains in a fixed position during radiation detection, axis 24 providing merely the capability of adjusting the fixed elevation angle at which the radiation from the terrain is received. Azimuth scan mirror 23 is in the shape of a pyramid with a square base, being rotatable about axis 25 passing through the center of the base and the apex of the pyramid. The radiation reflected from the face of mirror 23 near mirror 22 is directed to folding mirror 26. As scan mirror 23 rotates in the direction shown about axis 25, the light which it directs to mirror 26 comes from an area on mirror 22 which moves across mirror 22 in the azimuthal direction. That is, mirror 23 scans mirror 22 in the azimuthal direction. Such scanning of mirror 22 by mirror 23 amounts, of course, to a scanning of the ground in an azimuthal direction, since the image produced by mirror 22 is that of the terrain. Further, as each of the four-mirrored sides of mirror 23 scans mirror 22 in succession, the resulting individual scans each begin at the end of mirror 22 which is nearest the foreground in FIG. 3 and sweep across the mirror in the azimuthal direction toward the furthermost end of the mirror. Folding mirror 26 is a fixed plane mirror which directs the rays from azimuthal scan mirror 23 to parabolic mirror 27. Mirror 27 has a uniform parabolic cross section throughout the length thereof, which causes parallel rays incident upon the surface of the mirror to be focused along a line running through the focal points of the cross sections. Detector 21 is located on this line of focal points. The rays focused on detector 21 by mirror 27 are limited by field stops 28, so that the radiation detected by detector 21 at any instant comes only from a small sector of terrain area 11. The use of parabolic mirror 27 provides more radiation from the small sector for detector 21 than would be provided if the sector were scanned using only plane mirrors.

The system illustrated by FIGS. 4 and 5 is that in which forward scan mirror 22 performs an elevation scan of the terrain forward of the aircraft. The system of FIGS. 4 and 5 drives the optics system and displays on a cathode-ray tube 30 a map of the terrain area 11, produced by the infrared radiation from the various points thereof. Azimuth scan drive motor 31 is driven at a constant speed by power supply 32 to rotate azimuth scan mirror 23 at a constant angular velocity about axis 25. The angular velocity of mirror 23 about axis 25 determines the frequency at which the terrain is scanned in the azimuthal direction; a typical angular velocity would be 1,200 radians/second. Forward scan mirror 22 may be driven in several ways by elevation scan drive 33. Scan drive 33 may comprise, for example, the apparatus illustrated in FIG. 5. In the apparatus in FIG. 5, forward scan mirror 22 is rigidly connected to spur gear 34, which rotates about a fixed axis 35. Sector gear 36, also rotating about a fixed axis 37, has as an integral part thereof a slotted arm 38. The slot in arm 38 receives pin 39 fixed to bar 40. Bar 40 is penetrated at the upper end by a fixed guide member 41 and at the lower end by a lead screw 42. Screw 42 is driven by motor 43. Power supply 44 powers motor 43, and switch 45 causes motor 43 to periodically reverse direction. Switch 45 may be timed, for example, by a fixed frequency oscillator (not shown). As screw 42 turns moving bar 40 toward or away from sector gear 36, the motion of pin 39 in the slotted arm 38 causes sector 36 to rotate and hence turn gear 34. With such an arrangement the angular velocity of the rotation of mirror 22 is given by the equation:

$$d\ /dt \times \omega L / h \cos^2 \alpha$$

where is the instantaneous angular displacement of mirror 22, $\omega$ equals the angular velocity of lead screw 42, L equals the lead of screw 42 (inches/revolutions), $h$ is the distance between pin 39 and shaft 37 as shown in the drawing, and $\alpha$ is the angle between arm 38 and a perpendicular to screw 42, as illustrated. Although the oscillating rotation produced by the apparatus in FIG. 5 yields exceptionally good elevation scan results, elevation scan drive 33 may alternatively be simply a motor, with the direction periodically reversed by switch 45. Further, scan drive 33 could be a motor driven in a predetermined oscillatory mode by a specially shaped power-voltage waveform generated by supply 44. In yet another embodiment, mirror 22 could be made to operate similarly as mirror 23, but having the shape of, say, a rectangular solid or a hexagonal solid. The latter multisided mirror would be driven at a constant angular velocity, as is mirror 23, and would produce an elevation scan which began each time, at say, the forward portion of terrain area 11 and swept back toward the aircraft.

Pulse pickups 46 and 47 detect the angular positions of mirrors 22 and 23 for the purpose of properly displaying on cathode ray tube 30 the radiation sensed by detector 21. Each of pulse pickups 46 and 47 is a commonly used device, which may comprise, for example, two discs located parallel and concentric with each other, one disc being fixed and one being mounted on the shaft of a motor such as motor, 31, one disc having several light sources on the periphery thereof, and the other disc having appropriately located light sensors which detect the rotation of the disc mounted on said shaft by detecting the motion of the light sources. Pulse pickup 47 is arranged to produce a pulse each time shaft 25 rotates so that one face of scan mirror 23 begins to scan across the face of mirror 22. Pulse pickup 46 may similarly be arranged to produce a pulse when mirror 22 begins a scan.

Pulse amplifier 48 amplifies the pulses produced by pickup 47 and applies the amplified pulses to horizontal gate generator 49. Generator 49 is of the construction normally employed in cathode-ray tube displays, being responsive to a pulse from amplifier 48 to generate a pulse which has as its duration the period during which the face of cathode-ray tube 30 is to be scanned in the horizontal direction. Horizontal sweep generator 50, also of the commonly used construction, generates a linearly increasing voltage during the period of the gate pulse generated by generator 29. The linearly increasing voltage is applied to amplifier 51 which drives the horizontal deflection coil 52 of cathode-ray tube 30. The driver amplifier is connected to deflection coil 52 so that the linearly increasing voltage from generator 50 causes the cathode ray to sweep across the tube face in a horizontal direction at a constant rate. This is commonly accomplished by connecting the coil 52 in series with the collector circuit of an output transistor amplifier stage. At the termination of the horizontal gate pulse, the output of sweep generator 50 falls suddenly to its nonpulsed value, causing the cathode ray to return instantly to the side of the cathode-ray tube at which it began its sweep. Thus, each sweep begins at the same side of the tube. Such a sweep mode corresponds to the ground scan produced by rotating mirror 23 in the azimuthal direction.

The pulse from pulse pickup 46 is amplified by pulse amplifier 53 and applied to vertical gate generator 54. At the receipt of the pulse from amplifier 53, the generator 54 causes vertical sweep generator 55 to apply an output to amplifier 56 which drives the vertical deflection coil 57 of cathode-ray tube 30 as horizontal deflection coil 52 is driven. If mirror 22 operates in one of the oscillatory modes, rather than beginning each of its sweeps at say, the most forward portion of terrain area 11, vertical sweep generator 55 may be made to sweep the cathode ray of tube 30 alternately up and down the face of the tube. Thus, the gate pulse generated by gate generator 54 may be made to have alternate polarities for alternate pulses. Then, sweep generator 55 may be made to produce a linearly increasing voltage for a gate pulse of one polarity and a linearly decreasing voltage for a pulse of the opposite polarity. Alternatively, the vertical sweep generation circuit may be made to produce a cathode-ray tube sweep only when mirror 22 is performing an elevation scan in one direction, making no sweep when the mirror is scanning in the other direction. In the latter case, the electrical signals representative of the radiation sensed by detector 21 (which may be for example a detector of the long wavelength type such as Mercury-doped Germanium-sensitive in the 8 to 14 micron region) are continuously applied as in the other cases to amplifier 58 which applies the amplified signals to the grid 59 of tube 30, but on alternate scans there would be no presentation of the information on the face of tube 30. In the case where mirror 22 is a multisided mirror similar to mirror 23, the operation of the vertical sweep circuitry is the same as that of the horizontal sweep circuitry.

The apparatus of FIG. 5 causes the elevation scan by mirror 22 to move across flat ground at a linear rate. Hence, the generation in tube 30 of a vertical sweep at a linear rate produces an accurate image of the area 11 forward of the aircraft. To enchance the accuracy of displays corresponding to other modes of rotating mirror 22, a diode function generator of the type used in analog computers may be interposed between sweep generator 55 and amplifier 56 to produce a nonlinear vertical sweep in tube 30. The cathode ray of tube 30 may thus be made to sweep the face of the tube in the same way as the elevation scan is scanning terrain area 11.

Cathode-ray tube 30 is of the direct-view-storage tube type, for example, a H1084BP20 manufactured by Hughes Aircraft Company. Because of the synchronization of the horizontal and vertical sweeps with the azimuth and elevation scans performed by mirrors 23 and 22, the cathode ray sweeps the face of tube 30 in just the same way as the small sector sensed by detector 21 scans terrain area 11. Because of the signal applied to grid 59, the light intensity at any point on the face of tube 30 is an indication of the radiation emitted by the corresponding spot in terrain area 11. The persistance of an image on the face of tube 30 is sufficiently long to provide a suitable image thereon, even at the slow mechanical scan rate provided by mirrors 22 and 23. Thus, there is provided a visible, instantaneous display of the infrared radiation detected in terrain area 11 forward of the aircraft.

When the apparatus of the invention is used in a military weapons system, it may be required that the display on the face of tube 30 provide a sufficiently accurate description of target location and identification to enable a weapon to be directed against selected targets viewed thereon. Several features of the invention contribute to the accuracy of the display. The fact that azimuthal scan mirror 23 begins each scan at the same side of terrain area 11 makes possible the use of a horizontal sweep in tube 30 which begins each sweep at one side of the tube face, moves to the other side during a first period, then returns to the one side in a period which is instantaneous compared with the first period. Such a sweep pattern yields a more favorable display than one which sweeps back and forth in equal periods, because the latter display overexposes the display tube phosphor near the edges of the screen due to the partial overlapping of successive horizontal scans. The favorable scan action provided by mirror 23 may be approximately by a mirror which scans in one direction with fast fly back to the starting position. Such a mirror, as well as mirror 23 can be described as providing successive scans, every one of which is in the same direction, for substantially the whole duration of each scan. Also contributory to accuracy is the fact that mirror 23 may be made to scan the ground much faster than the elevation scan. Such a scan gives full scanning coverage of the observed terrain. The ability of the invention to scan the entire width of the forward terrain area and at a speed faster than the elevation scan reduces distortion in the form of targets on one side of the terrain area being unduly displaced in the elevation dimension of the display with respect to targets on the other side because of the aircraft motion. Although the invention has been illustrated in terms of elevation and azimuth scans, certain of the advantages produced by the features of the invention may be realized when scanning in other dimensions, corresponding to other types of coordinates.

Figure 7:
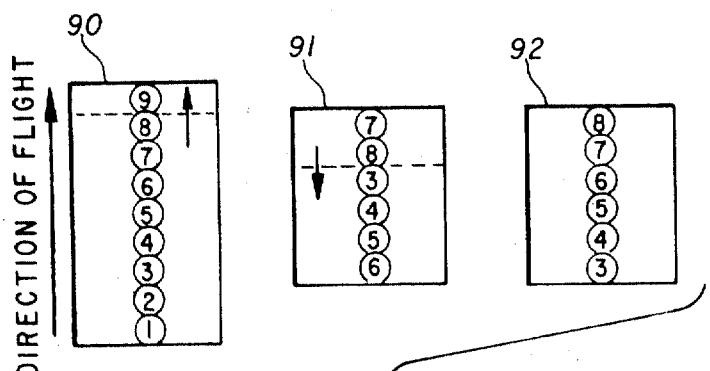
FIG. 7 illustrates the operation of the system of FIG. 6.
Figure 6:
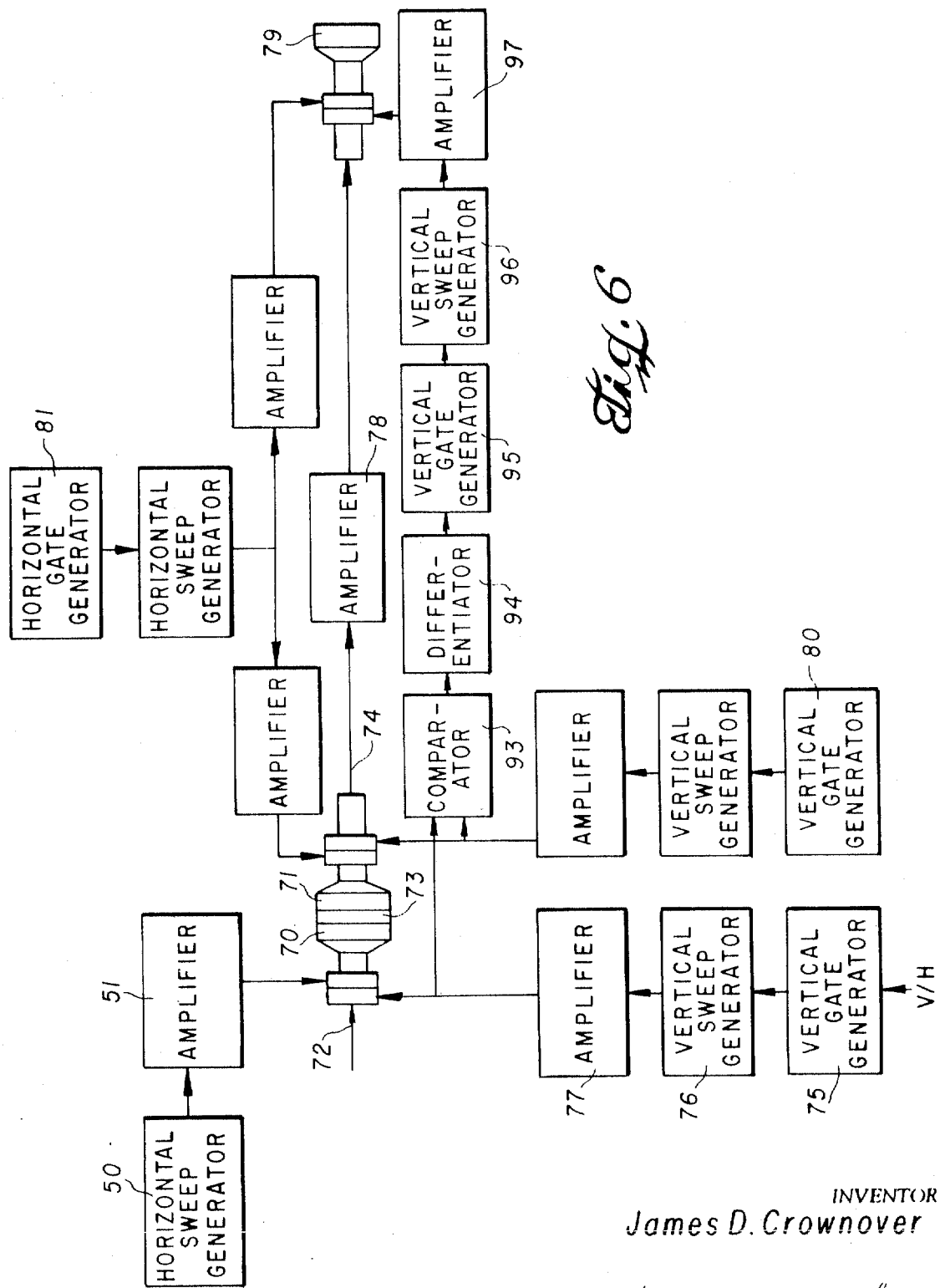
FIG. 6 is a diagram of the electrical portion of another embodiment of the invention.

In the embodiments of the invention illustrated by FIGS. 6 and 7, mirror 22 of FIG. 2 does not rotate during scanning. Instead, the motion of aircraft 10 is used to obtain a scan of the forward terrain area 11. To display a representation of the radiation detected by this type scan, the apparatus of FIG. 6 employs a scan-conversion unit comprising a write-tube 70 and a read-tube 71. Said scan-conversion unit may be, for example, a CK7702 manufactured by Raytheon Company. In such a unit, signals applied at the grid 72 of write-tube 70 are displayed on a storage screen 73 common to tube 70 and 71. Read-tube 71 may scan storage screen 73 and produce signals at the read output indicative of the display stored on screen 73. In the circuit of FIG. 6, the radiation detected by the scanning optics of FIG. 2 is displayed by write-tube 70 on screen 73. The horizontal sweep rate produced by horizontal sweep generator 50 is synchronized with the scan rate of azimuthal scan mirror 23 and is generated in the manner shown in FIG. 4. The vertical sweep rate, however, is made to correspond with the forward motion of the aircraft, since it is such motion which produces the elevation scan. Accordingly, the velocity, $V$, of the aircraft with respect to the ground and the height, $H$, of the aircraft above the terrain are sensed in the conventional manner, and the ratio $V/H$ controls the duration of the gate pulse produced by vertical-gate generator 75. Vertical sweep generator 76 and amplifier 77 apply to the vertical deflection coil of write-tube 70, a sweep signal of a duration proportional to $V/H$. Standard circuitry not shown in FIG. 6 erases the content of storage tube 73 just ahead of the writing cathode ray.

Read-tube 71 reads the display created by tube 70 and produces an output which is amplified by amplifier 78 and applied to display cathode-ray tube 79. Tube 79, for example, a WX31063P4 manufactured by Westinghouse Electric Corporation, requires significantly faster horizontal and vertical scan rate than the longer persistance write-tube 70; hence, vertical-gate generator 80, horizontal-gate generator 81 and the circuitry associated therewith, cause read-tube 71 to scan storage screen 73 at an appropriately high-vertical and - horizontal rate. Tube 79 uses the same horizontal sweep as does tube 71. It is the vertical sweep circuitry associated with tube 79 which enables that tube to produce a meaningful display from the display stored on screen 73. The operation of the vertical sweep circuitry will be explained with references to FIG. 7.

Plot 90 of FIG. 7 is a schematic representation of a terrain area as it might be seen looking forward from aircraft 10. For illustration, the infrared, as well as the visible, image of the terrain is shown as a group of numerals. Screen 91 is the display which would be stored on screen 73 just before the ground scan reaches numeral 9. On screen 91, numerals 3, 4, 5 and 6 are on the screen due to a previous write sweep and are numerals earlier detected by infrared detector 21. Thus, a new sweep began after numeral 6, and the numeral 7 was accordingly placed at the top of screen 91. The dotted line represents the portion of the screen which is being erased and rewritten by the cathode ray in accordance with the down scan of detector 21. The vertical sweep is moving in the direction of the arrows in screen 91. The dotted line and arrows on plot 90 indicate the corresponding infrared scan. The display on screen 91 is that read by read-tube 71, and produced as video signals at output 74. Read-tube 71 reads the information out from the bottom of screen 91 to the top, so that the numbers come out in sequence, 6, 5, 4, 3, 8, 7. Successive read scans would result in signals corresponding to the image sequence 6, 5, 4, 3, 8, 7, 6, 5, 4, 3, 8, 7, etc. being applied to amplifier 78. Screen 92 represents the display on the face of tube 79. Such a display results from synchronizing the vertical sweep of tube 79, so that the cathode ray in tube 79 begins to sweep down the face of that tube after the numeral 3 and before the numeral 8, that is, the location of the writing ray in tube 70. Beginning successive sweeps at this point causes the numbers to come out in the order 8, 7, 6, 5, 4, 3. As the writing ray of tube 70 moves down the storage screen, as seen by the dotted line on screen 91, the display on screen 92 appears to move down the screen. For example, when the ground scan reaches numeral 9, numeral 9 will replace numeral 3 on screen 91 and will appear at the top of screen 92, numeral 3 moving off screen 92 at the bottom. Thus, there is produced a display of infrared radiation, which is comparable to the scene which would be seen by looking forward of the aircraft.

The circuitry necessary to begin these vertical sweeps of tube 79 so as to display the most newly sensed radiation information at the top of the tube face, is seen in FIG. 6. High gain comparator 93 and differentiating circuit 94 form a coincidence circuit, which detects when the write scan in tube 70 is at the same position on screen 73 as is the read scan of tube 71. When the current supplied to the vertical deflection coil of each tube is the same, indicating that the beam of each tube is at the same position, high-gain comparator 93 produces a change in the output thereof from one polarity to another. Differentiation circuit 94 operating on the latter change of polarity produces a pulse, the polarity of which depends on whether the change is from positive to negative or negative to positive. Vertical-gate generator 95 may be made to respond to pulses of only one polarity to activate vertical-sweep generator 96 and amplifier 97 to begin the vertical sweep of tube 79. That is, the comparator-differentiator circuit signals tube 79 that the information currently being read by tube 71 is that which is just being written by tube 70, hence the newest information.

As with the embodiment with the invention shown in FIG. 4, it is seen that an operator using the display of tube 79 has at his disposal an accurate, realistic infrared picture of the terrain forward of the aircraft.

It is to be understood that the above-described embodiments are merely illustrative of the application of the principles of the invention. Numerous other arrangements may be devised by those skilled in the art without departing from the spirit and scope of the invention as defined by the appended claims.

What is claimed is:

1. An apparatus for visually displaying the infrared image of an area forward of an aircraft, comprising:
   an infrared detector,
   first optical means including infrared-reflecting mirror means moving in rotational motion transmitting radiation to said detector for viewing said forward area with successive scans along a first scan dimension,
   second optical means including multiple infrared-reflecting mirrors rotating about a single axis transmitting radiation to said detector for simultaneously scanning said area along a second scan dimension with successive scans transverse to the flight path of said aircraft, every one of said scans being in the same direction for substantially the whole duration of each scan,
   said second optical means further including means for scanning said area at a speed greater than that provided by said first optical means, and
   display means responsive to said detector for producing a visual image of the radiation sensed by said detector along a first display dimension corresponding to said first scan dimension and along a second display dimension corresponding to second scan dimension.

2. An apparatus for visually displaying the infrared image of an area forward of an aircraft, comprising:
- an infrared detector,
- first optical means including infrared mirror means moving in rotational motion transmitting radiation to said detector for viewing said forward area with successive elevation scans in the same direction for substantially the whole duration thereof,
- second optical means, transmitting radiation to said detector and including multiple infrared-reflecting mirrors rotating about a single axis, for simultaneously scanning said area with successive azimuth scans, every one of said azimuth scans being in the same direction for substantially the whole duration thereof, said second optical means further including means for scanning said area at a higher speed than that provided by said first optical means, each of said azimuth scans encompassing the width of said area, and
- display means responsive to said detector for producing a visual image of the radiation sensed by said detector along a first display dimension corresponding to said elevation scan and along a second display dimension corresponding to said azimuth scan.

3. An apparatus for visually displaying the infrared image of an area forward of an aircraft, comprising:
- an infrared detector,
- first optical means including infrared-reflecting mirror means moving in oscillatory rotational motion-transmitting radiation to said detector for viewing said forward area with successive elevation scans,
- second optical means, transmitting radiation to said detector and including multiple infrared-reflecting mirrors rotating about a single axis, for simultaneously scanning said area with successive azimuth scans, every one of said azimuth scans being in the same direction for substantially the whole duration thereof, said second optical means further including means for scanning said area at a higher speed than that provided by said first optical means, each of said azimuth scans encompassing the width of said area, and
- display means responsive to said detector for producing a visual image of the radiation sensed by said detector along a first display dimension corresponding to said elevation scan and along a second display dimension corresponding to said azimuth scan.

* * * * *